(12) United States Patent
Blair

(10) Patent No.: US 11,760,002 B2
(45) Date of Patent: *Sep. 19, 2023

(54) SYSTEM AND METHOD FOR CALIBRATING A 3D PRINTER

(71) Applicant: XEROX CORPORATION, Norwalk, CT (US)

(72) Inventor: Christopher D. Blair, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 282 days.

This patent is subject to a terminal disclaimer.

(21) Appl. No.: 17/324,900

(22) Filed: May 19, 2021

(65) Prior Publication Data

US 2021/0268720 A1 Sep. 2, 2021

Related U.S. Application Data

(63) Continuation of application No. 16/586,803, filed on Sep. 27, 2019, now Pat. No. 11,072,111.

(51) Int. Cl.
| | |
|---|---|
| *B33Y 50/02* | (2015.01) |
| *B29C 64/393* | (2017.01) |
| *B29C 64/118* | (2017.01) |
| *B29C 64/232* | (2017.01) |
| *B29C 64/245* | (2017.01) |
| *B29C 64/209* | (2017.01) |
| *B29C 64/236* | (2017.01) |
| *B33Y 10/00* | (2015.01) |
| *B33Y 30/00* | (2015.01) |

(52) U.S. Cl.
CPC .......... *B29C 64/118* (2017.08); *B29C 64/209* (2017.08); *B29C 64/232* (2017.08); *B29C 64/236* (2017.08); *B29C 64/245* (2017.08); *B29C 64/393* (2017.08); *B33Y 50/02* (2014.12); *B33Y 10/00* (2014.12); *B33Y 30/00* (2014.12)

(58) Field of Classification Search
CPC ... B29C 64/118; B29C 64/209; B29C 64/232; B29C 64/236; B29C 64/245; B29C 64/393; B33Y 10/00; B33Y 30/00; B33Y 50/02

See application file for complete search history.

(56) References Cited

U.S. PATENT DOCUMENTS

| | | | |
|---|---|---|---|
| 10,155,346 B1 * | 12/2018 | Gorgi | B29C 64/106 |
| 2017/0251713 A1 * | 9/2017 | Warner | A23P 30/20 |
| 2019/0030818 A1 * | 1/2019 | Herman | B33Y 50/02 |

OTHER PUBLICATIONS

Author Unknown "3D Printer Axis—All You Need to Know | All3DP," Craftcloud, downloaded from https://all3dp.com/2/3d-printer-axis-all-you-need-to-know on Sep. 27, 2019, 13 pages.

(Continued)

*Primary Examiner* — Yuhui R Pan
(74) *Attorney, Agent, or Firm* — MH2 Technology Law Group LLP

(57) ABSTRACT

A three-dimensional (3D) printer includes a tool configured to extrude a material onto a surface to produce a 3D object. The 3D printer also includes a first movement device configured to move the tool in a first direction while the material is being extruded. The 3D printer also includes a first sensor configured to measure a first parameter of the first movement device as the first movement device moves the tool in the first direction.

17 Claims, 5 Drawing Sheets

(56) References Cited

OTHER PUBLICATIONS

Author Unknown, "3D Printer Basics," posted on Apr. 18, 2013, 3D Printer Basics | Gronkbot 3D Printing, 3 pages.
Author Unknown, "FamBot: An Open Source 3D Farming Printer That Aims to Create Food for Everyone / 2045 Initiative," Aug. 20, 2014, 4 pages.
Rehorst, "Mark Rehorst's Tech Topics: UMMD 3D Printer Cored XY Mechanism," Jul. 25, 2017, 18 pages.

* cited by examiner

# SYSTEM AND METHOD FOR CALIBRATING A 3D PRINTER

CROSS-REFERENCE TO RELATED APPLICATIONS

This application is a continuation of U.S. patent application Ser. No. 16/586,803, filed on Sep. 27, 2019, the entirety of which is incorporated by reference herein.

TECHNICAL FIELD

The present teachings relate generally to three-dimensional (3D) printing and, more particularly, to systems and methods for calibrating a fused deposition modeling (FDM) 3D printer.

BACKGROUND

A gap (also referred to as a standoff) exists between an extrusion nozzle of a FDM 3D printer and the surface on which it is printing. If the gap is too small, the material extruded from the nozzle may be restricted from flowing out of the nozzle at the desired rate due to contact with the surface, which may result in less than the desired amount of material being deposited on the surface. In addition, if the gap is too small, the nozzle may dislodge a previously-deposited portion of the material (e.g., a lower layer). If the gap is too large, the material may not adhere to the surface. Moreover, if the gap is too large, the material may have poor layer-to-layer adhesion. Therefore, there is a need to maintain the gap within a predetermined range.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A three-dimensional (3D) printer is disclosed. The 3D printer includes a tool configured to extrude a material onto a surface to produce a 3D object. The 3D printer also includes a first movement device configured to move the tool in a first direction while the material is being extruded. The 3D printer also includes a first sensor configured to measure a first parameter of the first movement device as the first movement device moves the tool in the first direction.

In another embodiment, the 3D printer includes a track and a frame coupled to the track and configured to move along the track. The 3D printer also includes a tool mount coupled to the frame and configured to move along the frame. The 3D printer also includes an extruder coupled to the tool mount. The extruder is configured to extrude a material onto a surface to produce a 3D object. The 3D printer also includes a first motor configured to move the frame along the track in a first direction in a substantially horizontal plane while the material is being extruded. The 3D printer also includes a first sensor configured to measure a first electrical parameter of the first motor as the first motor moves the frame along the track.

A method for operating a three-dimensional (3D) printer is also disclosed. The method includes moving a tool in a first direction using a first movement device. The method also includes extruding a material from the tool onto a surface as the tool moves in the first direction to produce a 3D object. The method also includes measuring a first parameter of the first movement device using a sensor as the tool moves in the first direction and extrudes the material.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
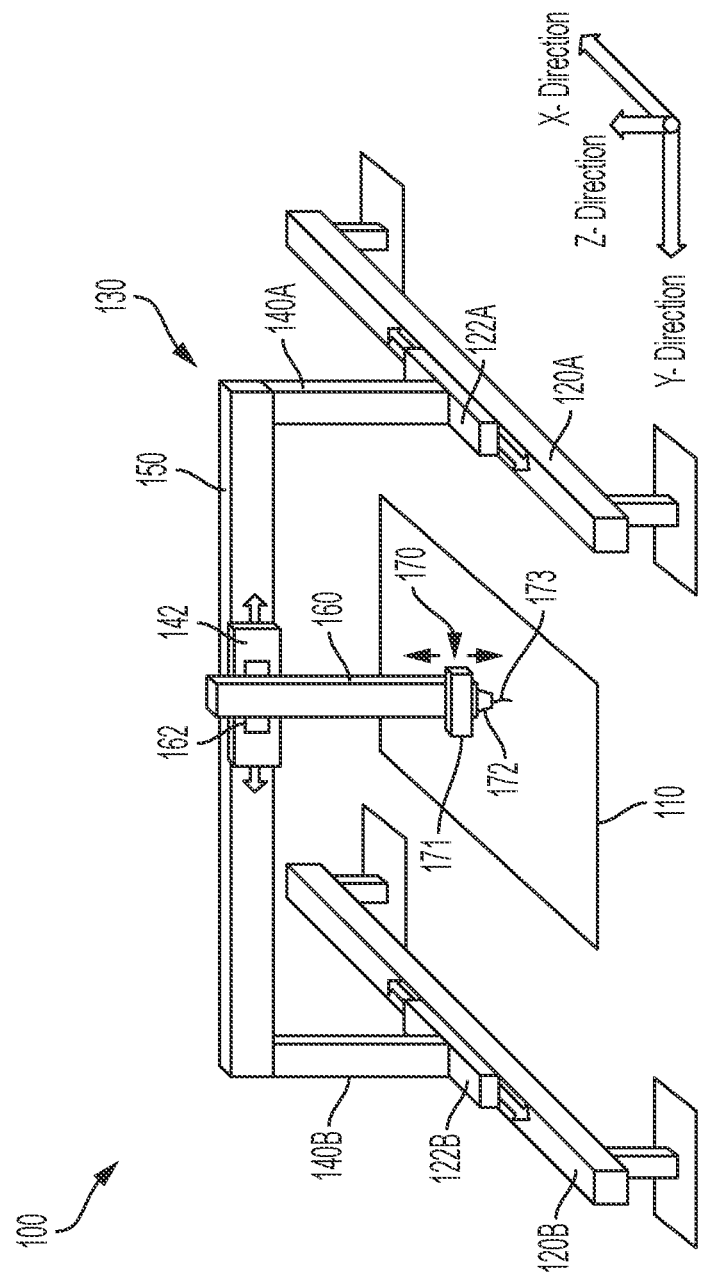
FIG. 1 depicts a perspective view of a 3D printer with a tool that is configured to move vertically (e.g., along a Z axis) with respect to a substrate, according to an embodiment.

FIG. 1 depicts a perspective view of a 3D printer 100, according to an embodiment. As described below, the printer 100 may be configured to move in three dimensions to print a 3D object on a substrate 110. The printer 100 may include one or more tracks (two are shown: 120A, 120B). The tracks 120A, 120B may be substantially parallel and extend along an X axis.

The printer 100 may also include a frame 130. The frame 130 may be coupled to the tracks 120A, 120B and configured to move with respect to the tracks 120A, 120B. The frame 130 may include one or more legs (two are shown: 140A, 140B). The legs 140A, 140B may be coupled to the tracks 120A, 120B and configured to move with respect to the tracks 120A, 120B. The legs 140A, 140B may extend from the tracks 120A, 120B along a Z axis that is substantially perpendicular to the X axis. More particularly, the first leg 140A may be coupled to the first track 120A and extend (e.g., vertically and/or upward) therefrom, and the second leg 140B may be coupled to the second track 120B and extend (e.g., vertically and/or upward) therefrom.

The frame 130 may also include a cross-beam 150 that is coupled to or integral with the legs 140A, 140B. The cross-beam 150 may extend from an upper end of the first leg 140A to an upper end of the second leg 140B along a Y axis that is substantially perpendicular to the X axis and the Z axis.

The printer 100 may also include a tool mount 160 that is coupled to the cross-beam 150. In at least one embodiment, the tool mount 160 may be configured to move along the Y axis and/or the Z axis with respect to the cross-beam 150. However, in another embodiment, the tool mount 160 may be configured to move along the Y axis but not the Z axis. The tool mount 160 may be substantially parallel to the legs 140A, 140B and substantially perpendicular to the tracks 120A, 120B and the cross-beam 150. Thus, the tool mount 160 may extend (e.g., vertically and/or downward) from the cross-beam 150 in the direction of the Z axis.

A tool 170 may be coupled to the tool mount 160. In at least one embodiment, the tool 170 may be configured to move along the Z axis with respect to the tool mount 160. However, in another embodiment, the tool 170 may be stationary/fixed with respect to the tool mount 160. The tool 170 may be or include an extruder 171 and a nozzle 172. The extruder 171 may be configured to extrude a material 173 (e.g., downward) through the nozzle 172 onto a surface. The material 173 may be or include a heated plastic filament. The surface may be or include the substrate 110 and/or a layer of the material 173 that is positioned on/above the substrate 110, as described in greater detail below with respect to FIG. 3.

The printer 100 may also include one or more first movement devices (two are shown: 122A, 122B). One of the first movement devices 122A may be coupled to the first track 120A and/or the first leg 140A, and another of the first movement devices 122B may be coupled to the second track 120B and/or the second leg 140B. In one example, the one first movement device 122A may be positioned at least partially between the first track 120A and the first leg 140A, and another first movement device 122B may be positioned at least partially between the second track 120B and the second leg 140B. The first movement devices 122A, 122B may be or include motors (e.g., stepper motors). The first movement devices 122A, 122B may be configured to move the frame 130, the tool mount 160, and the tool 170 along the tracks 120A, 120B in the direction of the X axis using a lead screw or a belt.

The printer 100 may also include one or more second movement devices (one is shown: 142). The second movement device 142 may be coupled to and/or positioned between the cross-beam 150 and the tool mount 160. The second movement device 142 may be or include a motor (e.g., a stepper motor). The second movement device 142 may be configured to move the tool mount 160 and the tool 170 along the cross-beam 150 in the direction of the Y axis using a lead screw or a belt.

The printer 100 may also include one or more third movement devices (one is shown: 162). In one embodiment, the third movement device 162 may be coupled to and/or positioned between the cross-beam 150 and the tool mount 160. The third movement device 162 may be or include a motor (e.g., a stepper motor). The third movement device 162 may be configured to move the tool mount 160 and/or the tool 170 with respect to the cross-beam 150 in the direction of the Z axis using a lead screw or a belt (or other suitable motion device such as a rack and pinion). This movement may maintain or vary the distance (also referred to as gap or standoff) 178 between the surface and the tool 170. In the embodiment of FIG. 1, the substrate 110 does not move along the Z axis, and the tool 170 moves along the Z axis.

Figure 2:
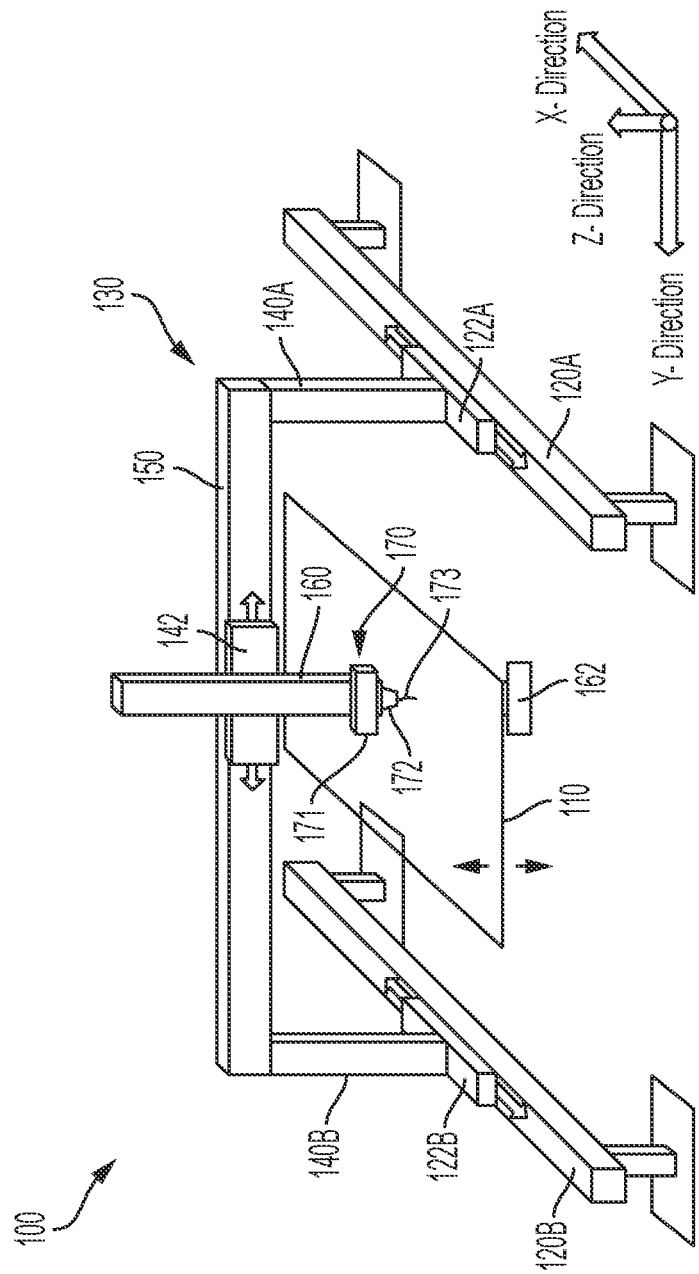
FIG. 2 depicts a perspective view of the 3D printer with the substrate (instead of the tool) configured to move vertically, according to an embodiment.

FIG. 2 depicts a perspective view of the printer 100 with the third movement device 162 configured to move the substrate 110 instead of the tool mount 160 and/or the tool 170, according to an embodiment. More particularly, in FIG. 2, the third movement device 162 may be coupled to the substrate 110 instead of the tool mount 160. Thus, the third movement device 162 may be configured to move the substrate 110 along the Z axis (e.g., up and down) to maintain or vary the distance 178 between the surface and the tool 170. In this embodiment, the tool mount 160 and the tool 170 may not be configured to move along the Z axis.

Although not shown, in other embodiments, the printer 100 may also or instead be or include any type of Cartesian Printer, such as an H-belt XY 3D printer, or the like. In each of these designs, the printer may include one or more of the movement devices 122A, 122B, 142, 162 that are configured to move the substrate 110 and/or the tool 170 along the X axis, the Y axis, and/or the Z axis.

Figure 3:
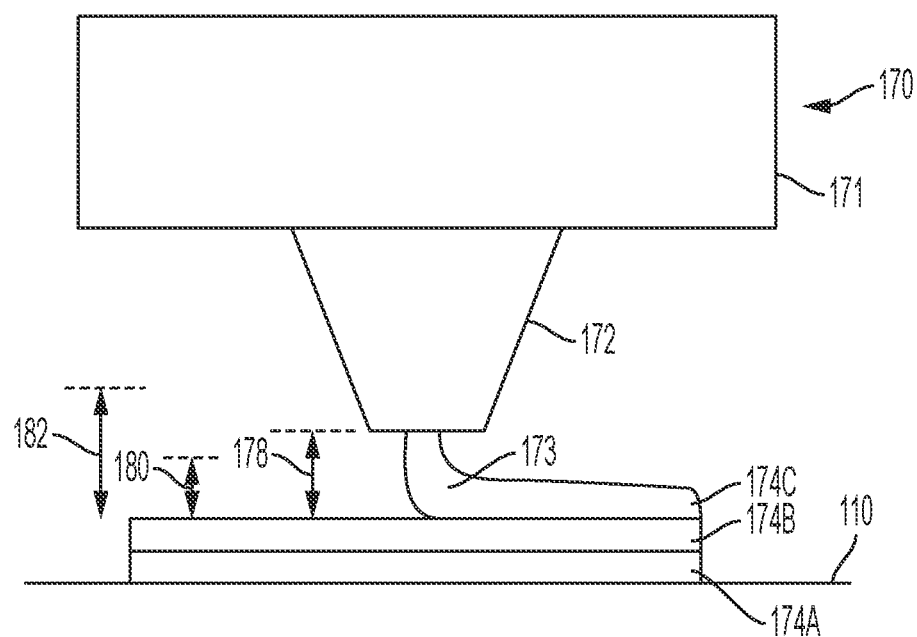
FIG. 3 illustrates a schematic side view of a portion of the 3D printer and a surface on which the 3D printer is printing, according to an embodiment.

FIG. 3 illustrates a schematic side view of the substrate 110 and the tool 170, according to an embodiment. As shown, the tool 170 may be positioned above the substrate 110. The tool 170 may be configured to extrude the material 173 through the nozzle 172 to form one or more layers (three are shown: 174A, 174B, 174C) on and/or above the substrate 110. As mentioned above, the surface 176 refers to the substrate 110 or the layer onto which the material 173 is being deposited. In the example shown in FIG. 3, the surface 176 refers to the (e.g., top of the) second layer 174B because the currently-extruded material 173 is being deposited onto the second layer 174B to form the third layer 174C. Thus, the distance 178 is defined between the tool 170 and the surface 176.

As the distance 178 decreases (e.g., while the tool 170 is moving along the X axis and/or the Y axis), a friction force exerted on the tool 170 in the direction opposite to the motion may increase. For example, when the distance 178 is less than a first predetermined distance 180, the friction force may be greater than a first predetermined friction force.

Similarly, as the distance 178 increases (e.g., while the tool 170 is moving along the X axis and/or the Y axis), a friction force exerted on the tool 170 in the direction opposite to the motion may decrease. For example, when the distance 178 is greater than a second predetermined distance 182, the friction force may be less than a second predetermined friction force.

As described below, it may be desirable to maintain the distance 178 between the first predetermined distance 180 and the second predetermined distance 182. This may facilitate extruding the desired amount of material 173 at the desired rate. It may also reduce the likelihood of dislodging a portion of a previously-deposited layer (e.g., layer 174B). In addition, it may facilitate the currently-deposited layer 174C adhering to the previously-deposited layer 174B.

Maintaining the distance 178 between the first predetermined distance 180 and the second predetermined distance 182 may maintain the friction force between the first predetermined friction force and the second predetermined friction force. The friction force(s) may be directly related to an electrical parameter of one or more of the movement devices 122A, 122B, 142, 162. The electrical parameter may be or include electrical current, voltage, power, or a combination thereof. For example, the friction force(s) may be directly related to the electrical current used by the movement devices 122A, 122B that move the tool 170 along the X axis, and the movement device 142 that moves the tool 170 along the Y axis.

For example, when the friction force is greater than the first predetermined friction force, then the electrical parameter (e.g., electrical current) used by the movement devices 122A, 122B, and/or 142 may be greater than a first electrical parameter threshold. This may be used to determine that the distance 178 is less than the first predetermined distance 180 (i.e., too close to the surface 176). Similarly, when the friction force is less than the second predetermined friction force, then the electrical current used by the movement devices 122A, 122B, and/or 142 may be less than a second electrical parameter threshold. This may be used to determine that the distance 178 is greater than the second predetermined distance 182 (i.e., too far from the surface 176).

Figure 4:
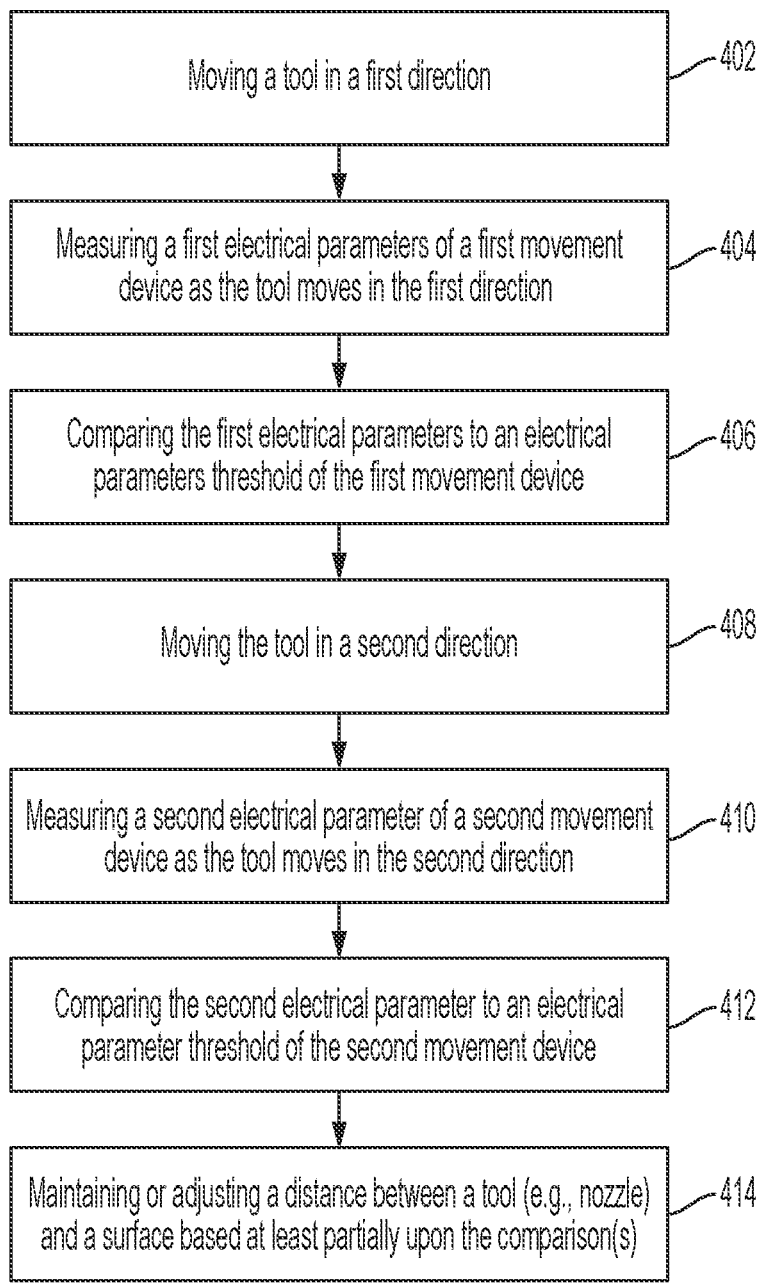
FIG. 4 illustrates a flowchart of a method for operating the 3D printer, according to an embodiment.

FIG. 4 illustrates a flowchart of a method 400 for operating the 3D printer 100, according to an embodiment. An illustrative order of the method 400 is provided below; however, it will be appreciated that one or more portions of the method 400 may be performed in a different order or omitted altogether.

The method 400 may include moving the tool 170 in a first direction, as at 402. The first direction may be in a substantially horizontal plane that is substantially parallel to the substrate 110. Thus, the first direction may be along the X axis, the Y axis, or a combination thereof. For example, moving the tool 170 in the first direction may include moving the frame 130 along the tracks 120A, 120B (e.g., along the X axis) using the first movement devices 122A, 122B. The tool mount 160 and the tool 170 may move together with the frame 130. The tool 170 may be printing (e.g., extruding the material 173 onto the surface 176) while moving in the first direction.

The method 400 may also include measuring a first electrical parameter of one or both of the first movement devices 122A, 122B as the tool 170 moves in the first direction, as at 404. For example, this may include measuring the electrical current drawn/used by the first movement devices 122A, 122B as the frame 130 moves along the tracks 120A, 120B. The first electrical parameter may be measured by one or more first sensors (two are shown in FIGS. 1 and 2: 124A, 124B). The first electrical parameter may be measured continuously or at predetermined intervals (e.g., every 500 milliseconds).

The method 400 may also include comparing the first electrical parameter of the first movement devices 122A, 122B to a first electrical parameter threshold of the first movement devices 122A, 122B and/or a second electrical parameter threshold of the first movement devices 122A, 122B, as at 406. For example, this may include comparing the first electrical parameter (e.g., electrical current) of the first movement devices 122A, 122B to a first electrical parameter threshold of the first movement devices 122A, 122B (e.g., 2 amps) and/or a second electrical parameter threshold of the first movement devices 122A, 122B (e.g., 1 amp). If the first electrical parameter of the first movement devices 122A, 122B is greater than the first electrical parameter threshold of the first movement devices 122A, 122B (e.g., the first electrical parameter is 2.5 amps), then it may be determined that the distance 178 is less than the predetermined distance 180, indicating that the tool 170 is too close the surface 176. If the first electrical parameter of the first movement devices 122A, 122B is less than the second electrical parameter threshold of the first movement devices 122A, 122B (e.g., the first electrical parameter is 0.5 amps), then it may be determined that the distance 178 is greater than the predetermined distance 182, indicating that the tool 170 is too far away from the surface 176. If the first electrical parameter of the first movement devices 122A, 122B is between the first electrical parameter threshold and the second electrical parameter threshold of the first movement devices 122A, 122B (e.g., the first electrical parameter is 1.5 amps), then it may be determined that the distance 178 is between the predetermined distances 180, 182, indicating that the tool 170 is at the desired distance from the surface 176.

The method 400 may also include moving the tool 170 in a second direction, as at 408. The second direction may be in a substantially horizontal plane that is substantially parallel to the substrate 110. Thus, the second direction may be along the X axis, the Y axis, or a combination thereof. For example, moving the tool 170 in the second direction may include moving the tool mount 160 along the cross-beam 150 (e.g., along the Y axis) using the second movement device 142. The tool 170 may move together with the tool mount 160. The tool 170 may be printing (e.g., extruding the material 173 onto the surface 176) while moving in the second direction.

The method 400 may also include measuring a second electrical parameter of the second movement device 142 as the tool 170 moves in the second direction, as at 410. For example, this may include measuring the electrical current drawn/used by the second movement device 142 as the tool mount 160 moves along the cross-beam 150. The second electrical parameter may be measured by a second sensor (one is shown in FIGS. 1 and 2: 144). The second electrical parameter may be measured continuously or at predetermined intervals (e.g., every 500 milliseconds).

The method 400 may also include comparing the second electrical parameter of the second movement device 142 to a first electrical parameter threshold of the second movement device 142 and/or a second electrical parameter threshold of the second movement device 142, as at 412. For example, this may include comparing the second electrical parameter (e.g., electrical current) of the second movement device 142 to a first electrical parameter threshold of the second movement device 142 (e.g., 4 amps) and/or a second electrical parameter threshold of the second movement device 142 (e.g., 3 amps). If the second electrical parameter of the second movement device 142 is greater than the first electrical parameter threshold of the second movement device 142 (e.g., the second electrical parameter is 4.5 amps), then it may be determined that the distance 178 is less than the predetermined distance 180, indicating that the tool 170 is too close to the surface 176. If the second electrical parameter of the second movement device 142 is less than the second electrical parameter threshold of the second movement device 142 (e.g., the second electrical parameter is 2.5 amps), then it may be determined that the distance 178 is greater than the predetermined distance 182, indicating that the tool 170 is too far away from the surface 176. If the second electrical parameter of the second movement device 142 is between the first electrical parameter threshold and the second electrical parameter threshold of the second movement device 142 (e.g., the second electrical parameter is 3.5 amps), then it may be determined that the distance 178 is between the predetermined distances 180, 182, indicating that the tool 170 is at the desired distance from the surface 176.

The method 400 may also include maintaining or adjusting the distance 178 based at least partially upon the comparison (at 406 and/or 412), as at 414. For example, if the first electrical parameter is greater than the first electrical parameter threshold of the first movement devices 122A, 122B and/or the second electrical parameter is greater than the first electrical parameter threshold of the second movement device 142, indicating that the distance 178 is less than the predetermined distance 180, then the third movement device 162 may increase the distance 178. The third movement device 162 may increase the distance 178 by moving the tool mount 160 and/or the tool 170 (e.g., upward) along the Z axis toward the surface 176 (as in FIG. 1), or by moving the substrate 110 and/or the surface 176 (e.g., downward) along the Z axis toward the tool 170 (as in FIG. 2). The third movement device 162 may reduce the distance 178 by a predetermined amount (e.g., 0.05 mm). The third movement device 162 may also or instead reduce the distance 178 to be between the distance 180 and the distance 182.

Although the foregoing description discloses increasing the distance 178 when the first electrical parameter is greater than the first electrical parameter threshold of the first movement devices 122A, 122B and/or the second electrical parameter is greater than the first electrical parameter threshold of the second movement device 142, in an alternative embodiment, the distance 178 may be decreased when the first electrical parameter is greater than the first electrical parameter threshold of the first movement devices 122A, 122B and/or the second electrical parameter is greater than the first electrical parameter threshold of the second movement device 142.

If the first electrical parameter is less than the second electrical parameter threshold of the first movement devices 122A, 122B and/or the second electrical parameter is less than the second electrical parameter threshold of the second movement device 142, indicating that the distance 178 is greater than the predetermined distance 182, then the third movement device 162 may decrease the distance 178. The third movement device 162 may decrease the distance 178 by moving the tool mount 160 and/or the tool 170 (e.g., downward) along the Z axis away from the surface 176 (as in FIG. 1), or by moving the substrate 110 and/or the surface 176 (e.g., upward) along the Z axis away from the tool 170 (as in FIG. 2). The third movement device 162 may increase the distance 178 by a predetermined amount (e.g., 0.05 mm). The third movement device 162 may also or instead increase the distance 178 to be between the distance 180 and the distance 182.

Although the foregoing description discloses decreasing the distance 178 when the first electrical parameter is less than the second electrical parameter threshold of the first movement devices 122A, 122B and/or the second electrical parameter is less than the second electrical parameter threshold of the second movement device 142, in an alternative embodiment, the distance 178 may be increased when the first electrical parameter is less than the second electrical parameter threshold of the first movement devices 122A, 122B and/or the second electrical parameter is less than the second electrical parameter threshold of the second movement device 142.

If the first electrical parameter is between than the first and second electrical parameter thresholds of the first movement devices 122A, 122B and/or the second electrical parameter is between the first and second electrical parameter thresholds of the second movement device 142, then the third movement device 162 may maintain (e.g., not change) the distance 178.

The distance 178 may be maintained or adjusted while the tool 170 moves in the first direction and/or the second direction. Alternatively, the tool 170 may stop moving in the first direction and/or the second direction while the distance 178 is adjusted. The distance 178 may be maintained or adjusted while the material 173 is extruded (e.g., to produce the 3D object). Alternatively, the tool 170 may stop extruding the material 173 while the distance 178 is adjusted.

In at least one embodiment, at least a portion of the foregoing method 400 may be performed while printing the desired object on the substrate 110. In another embodiment, at least a portion of the method 400 may be performed while printing registration lines (e.g., on the substrate 110), before the printing of the desired object begins. The registration lines may be printed on a portion of the substrate 110 that is different/away from the portion of the substrate 110 on which the desired object will be printed. This may help to calibrate the printer 100 before the printing of the desired object begins. In yet another embodiment, one or more adhesion lines (e.g., brim, skirt, and/or raft) may be used to perform an initial calibration.

In at least one embodiment, the printing surface 176 may be mapped by drawing one or more lines around the periphery of the surface 176. The map may be stored so that adjustments (at 414 above) may be made in real-time during printing. In at least one embodiment, a proximity switch may be placed proximate to the tool 170 (e.g., the nozzle 172) to measure/monitor the distance 178. In another embodiment, the distance 178 may be measured with a laser.

Figure 5:
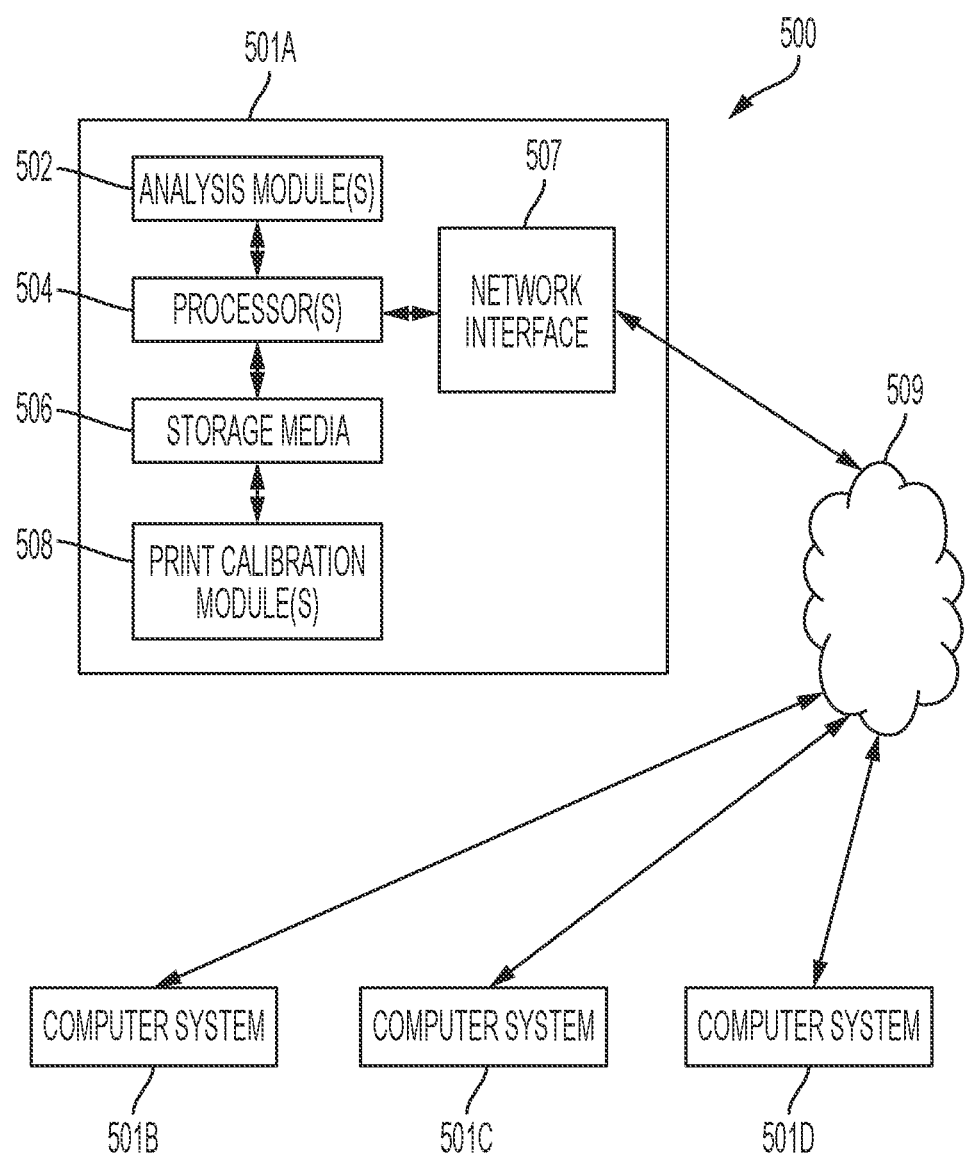
FIG. 5 depicts a computing system for performing at least a portion of the method, according to an embodiment.

FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis module(s) 502 configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor can include a microprocessor, microcontroller, processor module or subsystem, programmable integrated circuit, programmable gate array, or another control or computing device.

The storage media 506 can be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 500 contains one or more printer calibration module(s) 508 for performing at least some aspects of one or more embodiments of the method 400. It should be appreciated that computing system 500 is one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected.

Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A three-dimensional (3D) printer, comprising:
a tool configured to extrude a material onto a surface to produce a 3D object;
a first movement device configured to move the tool in a first direction while the material is being extruded, wherein the first movement device does not cause the material to be extruded; and
a first sensor configured to measure a first parameter of the first movement device as the first movement device moves the tool in the first direction and the material is extruded.

2. The 3D printer of claim 1, wherein moving the tool in the first direction generates a friction force in an opposite direction to the first direction, and wherein the first parameter is related to the friction force.

3. The 3D printer of claim 1, wherein the first direction is in a substantially horizontal plane.

4. The 3D printer of claim 1, wherein the first direction is substantially perpendicular to a direction that the material is extruded from the tool.

5. The 3D printer of claim 1, wherein the tool comprises a nozzle, and wherein the first direction is substantially perpendicular to a central longitudinal axis through the nozzle.

6. The 3D printer of claim 1, wherein a distance between the tool and the surface is maintained or varied in response to the first parameter.

7. The 3D printer of claim 6, wherein the first parameter comprises electrical current, wherein the electrical current increases as the distance decreases, and wherein the electrical current decreases as the distance increases.

8. The 3D printer of claim 6, wherein the distance between the tool and the surface is increased when the first parameter is greater than a first parameter threshold, and wherein the distance between the tool and the surface is decreased when the first parameter is less than a second parameter threshold.

9. The 3D printer of claim 6, further comprising:
a second movement device configured to move the tool in a second direction while the material is being extruded, wherein the second direction is substantially perpendicular to the first direction; and a second sensor configured to measure a second parameter of the second movement device as the second movement device moves the tool in the second direction, wherein the distance between the tool and the surface is maintained or varied in response to the second parameter.

10. A three-dimensional (3D) printer, comprising:

a track;

a frame coupled to the track and configured to move along the track;

a tool mount coupled to the frame and configured to move along the frame;

an extruder coupled to the tool mount, wherein the extruder is configured to extrude a material onto a surface to produce a 3D object;

a first motor configured to move the frame along the track in a first direction in a substantially horizontal plane while the material is being extruded, wherein the first motor does not cause the material to be extruded; and a first sensor configured to measure a first electrical parameter of the first motor as the first motor moves the frame along the track and the material is extruded.

11. The 3D printer of claim 10, wherein moving the frame in the first direction generates a friction force in an opposite direction to the first direction, and wherein the first electrical parameter is related to the friction force.

12. The 3D printer of claim 10, wherein a distance between the extruder and the surface is maintained or varied in response to the first electrical parameter.

13. The 3D printer of claim 10, wherein the frame comprises:

a leg that extends upward from the track; and a cross-beam that extends from the leg, wherein the tool mount is coupled to the cross-beam and configured to move along the cross-beam; and wherein the 3D printer further comprises:

a second motor configured to move the tool mount along the cross-beam;

a second sensor configured to measure a second electrical parameter of the second motor as the second motor moves the tool mount along the cross-beam; and a third motor configured to maintain or vary a distance between the extruder and the surface based at least partially upon the first electrical parameter, the second electrical parameter, or both.

14. A method for operating a three-dimensional (3D) printer, comprising:

moving a tool in a first direction using a first movement device;

extruding a material from the tool onto a surface as the tool moves in the first direction to produce a 3D object, wherein the first movement device does not cause the material to be extruded; and measuring a first parameter of the first movement device using a sensor as the tool moves in the first direction and extrudes the material.

15. The method of claim 14, wherein extruding the material from the tool onto the surface generates a friction force that is in an opposite direction to the first direction, and wherein the first parameter is related to the friction force.

16. The method of claim 14, further comprising adjusting a distance between the tool and the surface in response to the first parameter.

17. The method of claim 14, further comprising:

moving the tool in a second direction using a second movement device, wherein the second direction is substantially perpendicular to the first direction, and wherein the first and second directions are in a substantially horizontal plane;

extruding the material from the tool onto the surface as the tool moves in the second direction to produce the 3D object;

measuring a second parameter of the second movement device as the tool moves in the second direction and extrudes the material; and adjusting a distance between the tool and the surface in response to the first parameter, the second parameter, or both.

* * * * *